United States Patent [19]
Andersson

[11] 3,730,359
[45] May 1, 1973

[54] FREIGHT AIRCRAFT LOADING AND UNLOADING PLANT

[75] Inventor: Leif Anderson, Gothenburg, Sweden

[73] Assignee: Siccor Ltd., Zug, Switzerland

[22] Filed: May 20, 1971

[21] Appl. No.: 145,339

[30] Foreign Application Priority Data

May 27, 1970 Germany.................P 20 26 974.3

[52] U.S. Cl. ............................214/38 D, 244/137 R
[51] Int. Cl..............................................B65g 67/00
[58] Field of Search.....................214/38 B, 38 BA, 214/38 BB, 38 D; 244/114 R, 137 R

[56] References Cited

UNITED STATES PATENTS

| | | | |
|---|---|---|---|
| 3,162,404 | 12/1964 | Squire | 244/114 R |
| 1,594,494 | 8/1926 | Callison | 214/38 BB |
| 3,595,407 | 7/1971 | Muller-Kuhn | 214/38 BA |
| 3,215,090 | 11/1965 | Gibbs | 214/38 BA X |
| 2,470,696 | 5/1949 | Gonzalez et al. | 214/38 D X |
| 3,568,862 | 3/1971 | Walkhoff | 214/38 BA X |

Primary Examiner—Robert G. Sheridan
Attorney—Young & Thompson

[57] ABSTRACT

A freight aircraft loading and unloading plant has a pentagonal ground contour confining four spaces for the aircrafts and one space for a freight transport system. The ground contour of the individual spaces has been generated by dividing the regular pentagon into five similar sections by partition lines running from the middle of each side of the pentagon towards the center thereof. A cargo distributor including a turntable is mounted in the center and comprises also freight transfer stations. Aircraft are received in four of the spaces standing on a middle line therein with their noses towards the center and each in position for one of the freight transfer stations. The fifth section includes a transport arrangement for the cargo which passes on conveyor means to the transfer stations and is distributed therefrom to the correct aircraft by the turntable as the aircraft is loaded. Unloading takes place in the opposite direction. The plant is adapted to serve aircraft built for nose loading as well as for loading through the side of the hull.

16 Claims, 12 Drawing Figures

PATENTED MAY 1 1973 3,730,359

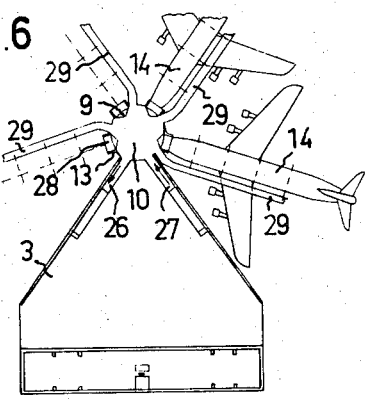
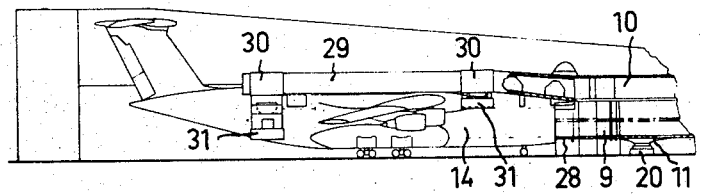
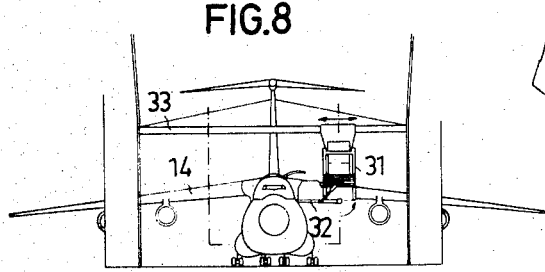
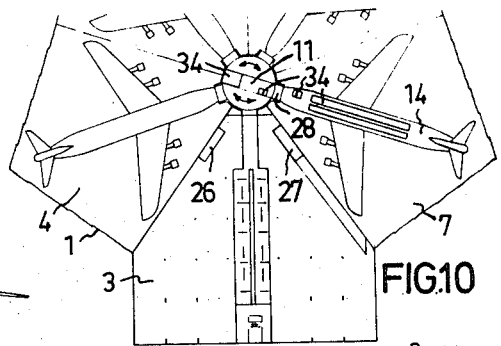
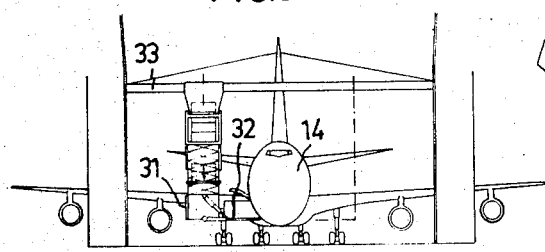
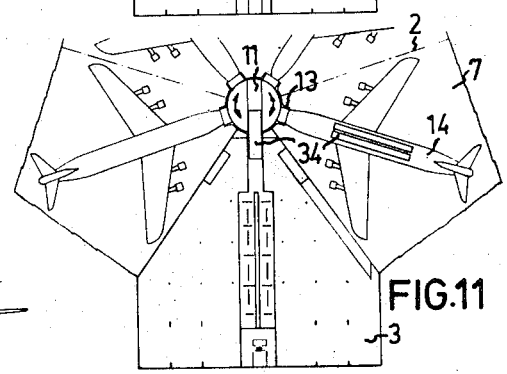

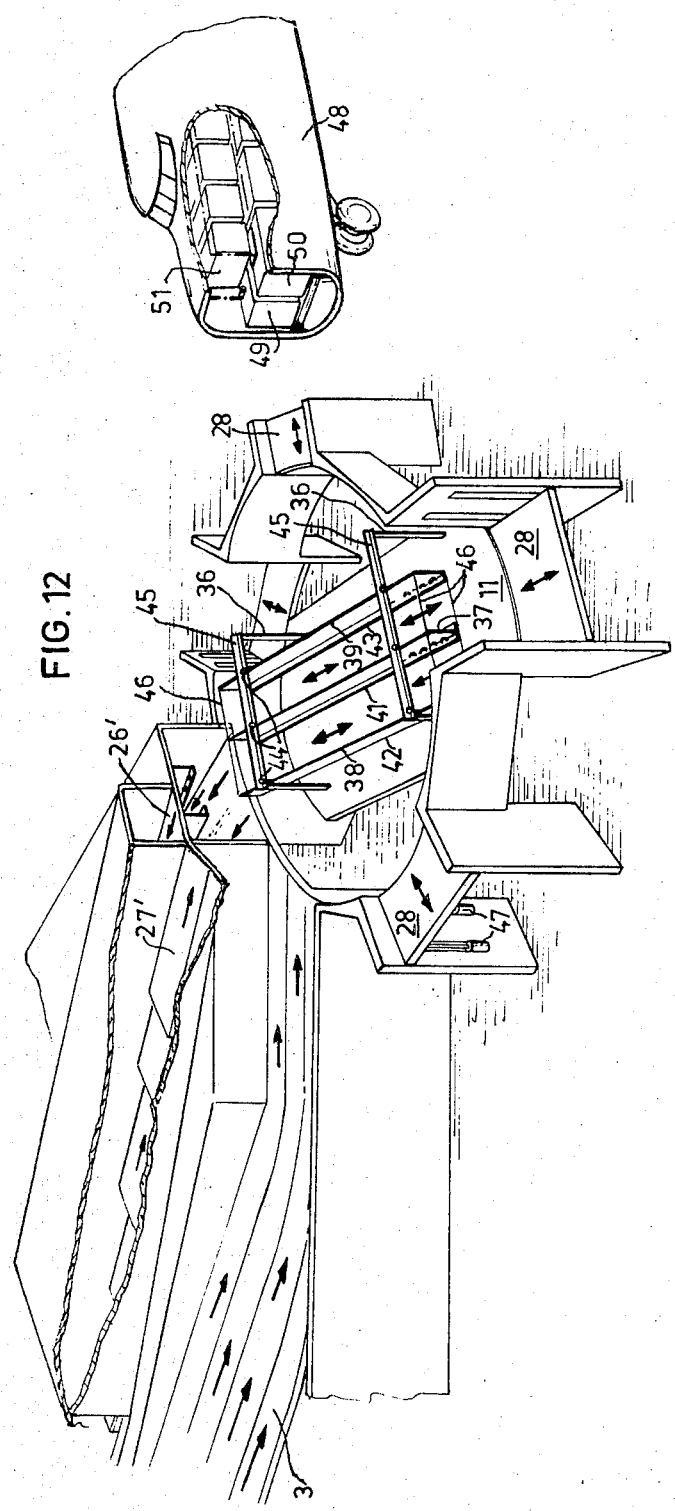

FREIGHT AIRCRAFT LOADING AND UNLOADING PLANT

This invention relates to a freight aircraft loading and unloading plant having an essentially polygonal ground outline with several cargo transfer stations in star shaped arrangement each adapted for receiving one aircraft to be attended to.

This star shaped arrangement of loading heads is known from the passenger air traffic. The airport of Bonn/Koln, (Federal Republic of Germany) e.g., has a new station comprising two star formed buildings. From the points of the star shaped building, which appropriately can be called a freight handling station, movable and extensible telescoping bridges lead the aircraft. The aircraft themselves remain in the open air.

Thus, while it is usual with passenger traffic to leave the aircraft in the open air, it is preferable to perform the loading and unloading of cargo in a so called hangar so as to make it independent of the weather. The newly introduced giant aircraft, often called Jumbo Jets, cause new problems because they require very large and costly hangar buildings and because they also require loading and unloading appliances which permit an uninterrupted and smooth loading and unloading, the rapid loading and unloading of a freight aircraft being one of the foremost requirements.

The possibility of relatively continuously attending to large aircraft is shown in "Space Aeronautics," October 1969, pages 40 and 41. There the sideways unloading of a conventional freight jet plane and the combined nose and side unloading of a super-freighter are shown. The cargo to be loaded through the side hatches of a super-freighter has of course to be conveyed long distances because it has to be led around the wide reaching wings. The loading of the main cargo space of a super-freighter with containers is effected from the nose end. The system described in the above cited publication requires immediately in front of the aircraft a cargo shunting or switch yard which must be dimensioned with regard to the capacity of the aircraft. If several super-freighters are stopping simultaneously at the same loading and unloading station, the demands on the plant are correspondingly multiplied since one or several more loading appliances of the same size each with a special cargo shunting or switching yard must be provided.

It is a purpose of the invention to provide a loading and unloading plant for freight aircraft permitting a continuous loading and unloading in which several aircraft can be simultaneously attended to. A further purpose of the invention is to permit the placing of the aircraft to be attended to within a hangar and to arrange the loading and unloading devices and the cargo distributing means in such a manner that the shortest conveying distances are obtained between a cargo magazine or an interposing magazine and the aircraft. Finally the plant according to the invention must be able to attend to the loading and unloading not only of super jet freighters (Jumbo Jets) but also of smaller freight aircraft.

According to the invention, it is therefore suggested to give the loading and unloading plant a mainly regular pentagonal ground outline which by straight lines running from the middle of each side to the center of the pentagon is divided in five sections of which one is arranged as a cargo admission and discharging transport device, a cargo distributor device placed in the center of the pentagon having connections as well with the freight distributor as with each of the cargo transfer stations placed in each of the aircraft receiving sections.

Hereby a plant for the loading and unloading of air freighters is provided which keeps the construction costs within economically profitable limits, and which further permits a continuous loading and unloading of successive air freighters without any dead time interval. As soon as an aircraft has been attended to, the attending of the next aircraft can begin. It is also possible to unload an aircraft simultaneously as another aircraft standing in another section is loaded. Hereby one of the purposes of the invention, the rapid attending of air freighters, is fullfilled. This rapid handling should further be obtained with economically advantageous means. This advantage is secured by the relatively low investment costs. The division of the plant in five sections according to the invention and their form lead to the result that not more than the space necessary for a super-freighter is enclosed in each section since the main axis represented by the longitudinal axis of the aircraft is directed radially towards the corners of the pentagon.

The sections thus provided for receiving the air freighters have a form approximately adapted to the outline of the aircrafts, whereby an optimal utilization of the space is obtained.

This system is new and advantageous as compared with the division of an aircraft hangar into six sections known from the German Pat. No. 238,035. The invention is thus characterized among other things in that one of the sections is formed into a transport device. Hereby and in connection with the further features of the invention, extremely short transport ways of the cargo from the transport device, which forms a kind of intermediate storage, to the air freighter are obtained.

The economy of the installation as a whole is further improved by the fact that the servicing of the airplane and smaller or larger repairs can be effected simultaneously with the loading and the unloading. If a repair takes more time than is necessary for the loading and unloading, this does not cause any disadvantages in the attending of other planes since there always are three further sections in which other planes can be received and attended to and since always at least one plane can be connected to a cargo transfer station.

It will thus be clear that by the cooperation of all the features of the invention a plant has been provided which will satisfy all the requirements of modern freight traffic, and which is of very high efficiency because of its relatively small capital costs and because of the fact that the loading and unloading can be performed without any interruption.

The moving of the cargo to and from the aircraft, the cargo consisting mainly of containers, is performed by the transport device which, so to say, forms a shunting yard or a switch yard for the cargo. In order to increase its capacity, the section containing the transport device can be widened outside the limits of the polygonal contour so as to form also a cargo storage space.

According to a further feature of the invention, the central portion of the transport device can be raised and lowered while its one side portion is arranged for the discharge and its other side portion is provided for the admission of the cargo, or both portions are arranged for the admission of cargo at intervals and at other times for the discharge of the cargo.

According to a still further feature of the invention, the central cargo distributor consists of two superposed parts, one of which is a main distributor adapted to the height level of the transport device and the other is a secondary distributor at a higher level, the secondary distributor being connected by one part to the transport device and by the other part to conveying bridges in each section, which bridges are suspended in supporting structures and are sideways movable each towards an air freighter standing in the section, said bridge being provided with a cargo transfer device within the range of a hatch in the aircraft.

The main distributor can consist of a turntable which can be raised and lowered to the level of the transport device and to the loading level of the aircraft, respectively, and which has means for moving the freight load resting thereon. A smooth transition between the turntable and the aircraft is made possible by a feature of the invention which is characterized in that the cargo transfer station has platforms which are movable upwards and downwards independently of the turntable to the levels of the turntable and to the loading level of the aircraft, respectively. These platforms can also take an inclined position in order to be able to follow the changes in position of the aircraft due to the unloading or loading thereof.

An adaptation to the different height levels of side hatches in different types of aircraft is obtained by the fact that the conveying bridge issuing from the secondary distributor has a cargo transfer device in the form of a lift, or elevator, which at its lower end has a projecting platform which is rotatable about a horizontal axis downwards from one horizontal position and up to the other and which can be secured in each of said horizontal positions.

In order to obtain a continuous transfer from the transport device to the secondary distributor, there is an inclined conveyor on each side of the main transport means between the transport device and the secondary distributor.

Air freighters are occasionally also used for passenger traffic, in which case as a rule a part of the loading space is installed as a passenger cabin. A feature of the invention is particularly well adapted for this purpose, in which the secondary distributor has an admission entrance from the building floor above the transport device which is reserved for the passenger traffic and in which the feeding bridge or bridges as well as the secondary distributor are especially adapted for passenger traffic. The passenger traffic is thus limited to the upper floor so that the loading and unloading of the cargo through the main distributor can be performed undisturbed.

Finally, according to still another feature of the invention, at least one of the sections adjacent the transport device is formed as a closed hall so that at least the aircraft placed in this section can be attended to within a closed room. During this attending in the closed hall, the necessary repairs and other servicing activities can be performed simultaneously. These activities can be facilitated by the fact that between the freight distributor and the underlying floor on which the air freighter is standing, there is sufficient space for the passage of aircraft tractors and other service vehicles.

For the location of all the auxiliary devices necessary for service and maintenance, the space beneath the transport devices is arranged to contain the tractor garages, the workshops and the spare part stores and has an entry door to the space beneath the freight distributor.

Some embodiments of the invention, which are illustrated in the accompanying drawings, are described in the following description in which the special advantages of the invention are further explained, which result from the cooperation of the spacial distribution and the arrangement of the entire plant with the chosen transport and loading devices. The chosen surface division in five sections gives an optimal utilization of the surfaces occupied by four large aircraft and gives by the use of the fifth section as a freight store the shortest possible transport ways to the aircraft whereby a rapid loading and unloading is effected. The shaping of the central distributor as a turntable capable of being raised and lowered makes it possible to attend to any of the adjacent aircraft and to adapt itself to any differences in level between the freight store and the cargo floor of the aircraft. The adaptability to the differences in level is especially important to permit the loading and unloading of all aircraft sizes.

In the drawings,

FIG. 6 shows a plan view of the secondary cargo distributor.

FIG. 7 is a side elevational view and shows some details of the secondary distributor.

FIG. 8 is a front elevational view and shows further details of the secondary distributor.

FIG. 9 is a view similar to FIG. 8 and shows still further details of the secondary distributor.

FIG. 10 illustrates the unloading process in a first phase.

FIG. 11 illustrates the unloading process in a second phase.

FIG. 12 is a perspective view illustrating a further embodiment of the main cargo distributor.

Figure 1:
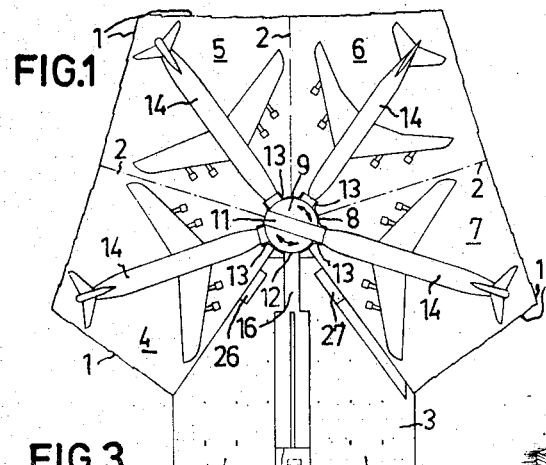
FIG. 1 shows a diagrammatical top plan view of the loading and unloading plant.

The plant for loading and unloading air freighters illustrated in FIG. 1 has an essentially pentagonal ground shape and separating walls 2 running from the middle of the sides 1 of the pentagon to its center to form five sections 3,4,5,6,7, one of which, i.e., section 3, is formed as a transport device. In the middle of the polygon there are central freight distributing means 8 consisting of a main distributor 9 and above this a secondary distributor 10, not illustrated in this figure. The main distributor 9 comprises a turntable 11 and the transport device 3 communicates through the entrance 12 with the turntable 11 and through the cargo transfer station 13 with the aircraft 14.

The transport device 3, which extends outside the polygonal contour of the plant, has a central portion 15 which can be raised and lowered, a smaller head portion 16 of which adjacent the entrance 12 can be displaced sideways. The central portion 15 divides the transport installation 3 into two spaces 17 and 18 situated on either side thereof, of which one side space 17 is arranged for the outgoing cargo and the other side space 18 for the incoming cargo.

Figure 2:
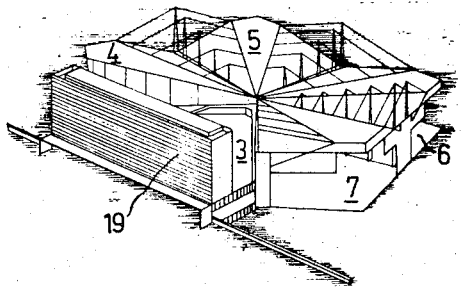
FIG. 2 shows a perspective view of the entire plant.

FIG. 2 is a total perspective view showing the hall or hangar shaped sections 4,5,6,7 and an administration building 19 placed in front of the transport section 3. In a first building stage of the plant, this could to begin with comprise only the sections 4 and 7 or only the sections 4 and 5 formed as covered spaced, i.e., as closed halls.

Figure 3:
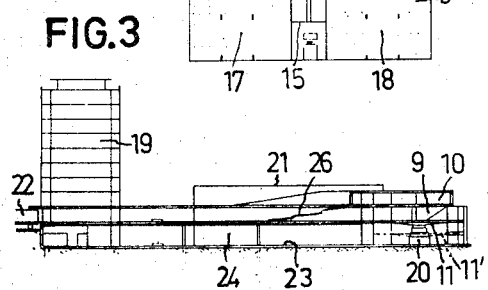
FIG. 3 shows a longitudinal section through a part of the plant according to FIG. 1.

FIG. 3 shows a longitudinal section through the transport device 3 including the central distributing means 8, the sections for the admission of the aircraft being not shown in this figure. A lowered position of the turntable 11 mounted on a telescopic support 20 is shown in dotted lines. The transport device is mainly located within the portion 21 of the building and extends also into the administration building 19. Incoming container trucks are indicated at 22. The space 24 situated beneath the transport device 3 in the plane of the taxiway 23 is formed into a store for spare parts, for service implements and as parking space for the aircraft tractors. The aircraft tractors are admitted to this space 24 through an entrance beneath the turntable.

Figure 4:
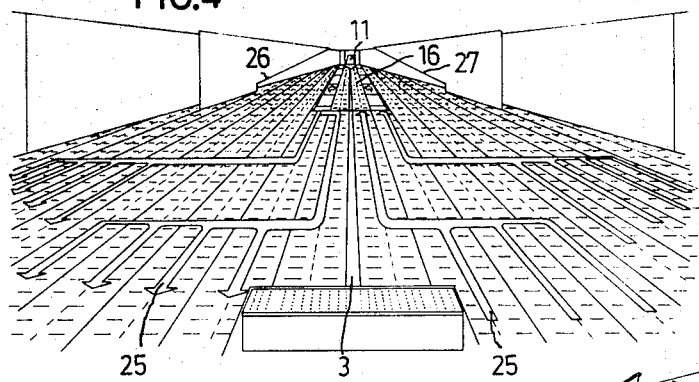
FIG. 4 shows a perspective view of the transport device.

FIG. 4 is a view into the transport space 3 towards the central distributor means 8. The head portion 16 is displaceable sideways. The flow of the cargo is illustrated by symbols 25. Inclined conveyors 26,27 lead to the secondary distributor 10.

Figure 5:
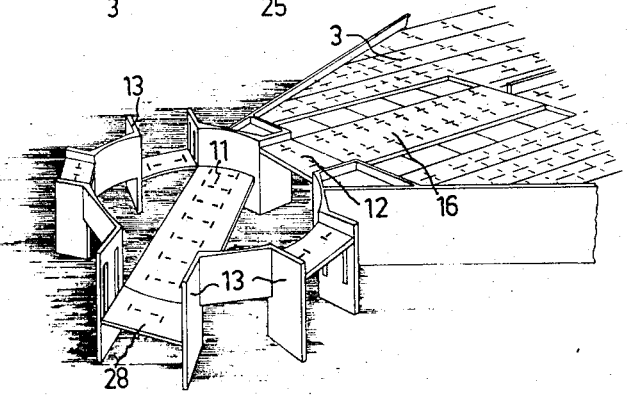
FIG. 5 shows a perspective view of the main cargo distributor.

FIG. 5 shows a perspective view of the central main distributor 9 with the vertically displaceable turntable 11. The turntable is shown at the level for loading and unloading a small freight aircraft. Lowered to the same level is the vertically adjustable platform 28 of the cargo transfer station 13. This figure shows clearly how a space is left for the admission of aircraft tractors and other service vehicles between the turntable 1 and the underlying ground floor on which the aircraft are standing.

FIG. 6 shows the secondary distributor 10 which is placed above the main distributor 9 represented mainly by the turntable 11 in FIG. 5. In each section a linked conveyor bridge 29 leads from the secondary distributor 10 to a cargo transfer device 30 placed within the range of a side hatch of an air freighter 14, as shown in FIG. 7. The cargo transfer device comprises, as further illustrated in FIGS. 8 and 9, an elevator 31 having at its lower end a projecting platform 32 which can be swung about a horizontal axis down and up to any of its two horizontal positions. A supporting structure 33 serves to suspend the conveyor bridge 29.

FIGS. 8 and 9 further illustrate the adaptability of the device to different types of aircraft.

As soon as an aircraft has landed, it rolls to the loading and unloading station where, after stopping the driving engines, it is pulled by a tractor into the desired section. Already before pulling the aircraft into the desired section, the nose is hoisted so that the tractor can pull the aircraft directly to its final loading and unloading position.

Before pulling in the aircraft, it must be ascertained that the corresponding conveyor bridge 29 is placed on the side of the aircraft on which the side hatch is situated. When the aircraft has come to a standstill within the section, the corresponding platform 28 of the cargo transfer station 13 is adjusted to the loading level of the air freighter, the cargo being conveyed on the platform first onto the turntable 11. Thereafter the turntable 11 is hoisted if necessary so as to bring it to the level of the transport means 3 and turned so that the part 34 of the cargo placed on the turntable 11 can be conveyed through the entrance 12 to the transport device 3. When loading an aircraft, the same process is performed in the opposite order and direction. FIGS. 10 and 11 illustrate this procedure.

Simultaneously with the unloading and loading of the main loading space generally loaded with containers, the unloading and loading of loading spaces situated above and beneath the main loading space is performed by means of the secondary distributor 10.

While the aircraft is loaded and unloaded, the service and maintenance necessary between landing and take-off can also be performed. Thus an aircraft on which e.g., an engine has to be exchanged, i.e., a larger repair has to be effected, will most often be placed in a section 4 or 7 adjacent to the transport device 3 so that the shortest possible ways to the workshops and the spare part stores situated beneath the transport device 3 are obtained.

In the embodiment illustrated in FIG. 12, the main cargo distributor has its turntable 11 equipped with stands 36 for a central rack 37 and two lateral racks 38,39 supporting a double central rail 41 and two lateral rails, 42 and 43, respectively, to form two runways for optional load, whereby the distributor is able to handle two series of containers on the turntable 11 proper and two series of cargo units on the rails 41,42,43 above the table. The racks 37,38,39 are suspended from journals for wheels 44 running on transverse horizontal guideways 45 forming parts of the stands 36,36, whereby the racks which are interconnected by cross rods 46 to form a cage may move as a unit transversely of the table 11. There are platforms 28 vertically adjustable by individually operable jacks 47 so that they may also be set to a somewhat oblique position as in the embodiment shown in FIG. 5.

In FIG. 12, the conveyors for laterally loaded aircraft are located in the middle of the transport section 3 to move the cargo up to a level above the main plane of the transport section. The two conveyors are in the form of flights of vertically reciprocating stairs 26',27' for lateral loading by a distributor of the type shown in FIG. 6.

The distributor 11 as shown in FIG. 12 is broader than that illustrated in FIG. 5, and due to the cage including guide rails for more than one row of cargo and also due to the space for at least two rows of containers side by side, said distributor according to FIG. 12 has an improved capacity and may be used for optional loading of larger freight aircraft. The forepart 48 of an aircraft is shown to the right in FIG. 12, portions of the hull being broken away to show the load in the position it takes before or after one upper row of cargo has been loaded thereinto or unloaded therefrom, respectively. There are two rows 49,50 of containers corresponding to the space on the turntable 11 proper and one upper row 51 of cargo units corresponding to one passageway in the cage suspended from the stands 36.

In a conclusion it will be recognized that the arrangement of the loading and unloading plant according to the invention yields a new and improved solution of the initially stated problems.

What I claim is:

1. A freight aircraft loading and unloading plant comprising a substantially pentagonal floor, separating walls extending from the middle of a plurality of sides of the pentagon and perpendicular to those sides, toward the center of the pentagon and terminating short of the center of the pentagon, to divide the pentagonal floor into four sections for four aircraft, and a fifth section of the floor having a transport device for the cargo, a cargo distributor in the center of the pentagon, and freight conveyor means in each of said four sections for conveying freight between the aircraft in said sections and said cargo distributor, said cargo distributor comprising means for transferring cargo between said conveyor means and said transport device.

2. A plant as claimed in claim 1, characterized in that the transport device is extended outside the pentagonal floor to form a widened cargo storing space.

3. A plant as claimed in claim 1, characterized in that the cargo distributor is arranged for hoisting and lowering, the portion on one side of said distributor being provided for the discharging of the cargo and the portion on the other side of the distributor being provided for the admission of the cargo.

4. A plant as claimed in claim 1, characterized in that the parts on both sides of the cargo distributor are provided for alternating discharging and admission of cargo.

5. A plant as claimed in claim 1, characterized in that the central cargo distributor consists of superposed primary and secondary distributor means, i.e., a main distributor adapted to the level of the transport device and a secondary distributor situated above the main distributor.

6. A plant as claimed in claim 5, characterized in that the main distributor consists of a turntable which is vertically displaceable to the level of the conveyor means in said fifth section and to the loading level of a freight aircraft and is provided with means for the displacement of cargo units and cargo containers resting thereon.

7. A plant as claimed in claim 5, characterized by a cargo transfer station that has platforms capable of being hoisted and lowered for adjustment to the level of the main distributor and to the loading level of an aircraft independently of the main distributor.

8. A plant as claimed in claim 7, characterized in that the platforms are inclined.

9. A plant as claimed in claim 4, characterized in that a secondary distributor is connected to the conveyor means in said fifth section and is connected in each of said four sections with a conveyor bridge which is suspended in a supporting structure which is movable to the side of an aircraft placed in the section and which within the range of a side hatch of the freight airplane is provided with cargo transfer means.

10. A plant as claimed in claim 9, characterized in that the conveyor bridge has a cargo transfer means consisting of a cargo elevator which at its lower end has a platform which can be swung downwards and over from one horizontal position to the other about a horizontal axis.

11. A plant as claimed in claim 9, characterized in that the connection between the secondary distributor and the fifth section conveyor means consists of inclined conveyors mounted on both sides of the last-named conveyor means.

12. A plant as claimed in claim 9 in which the secondary distributor has a passenger entrance from the storage of the plant situated above the transport device.

13. A plant as claimed in claim 1, in which at least one of the sections adjacent the fifth section conveyor means is formed as a closed hall.

14. A plant according to claim 1, characterized in that a space for the passage of aircraft tractors and service vehicles is provided between the cargo distributor and said floor.

15. A plant as claimed in claim 1, characterized in that the space beneath the fifth section conveyor means comprises tractor garages, workshops and spare part stores and also a passage to the space beneath the cargo distributor.

16. A plant as claimed in claim 1 and comprising a distributor provided with a turntable and a cage forming passage ways for at least one row of cargo units, and stands supporting said cage above the turntable at a level permitting rows of containers to pass on the turntable below said cargo units in the cage.

* * * * *